(12) United States Patent
Cornelius et al.

(10) Patent No.: US 10,318,224 B2
(45) Date of Patent: Jun. 11, 2019

(54) DATA CENTRIC DISPLAY COMMUNICATIONS

(71) Applicant: APPLE INC., Cupertino, CA (US)

(72) Inventors: William P. Cornelius, Saratoga, CA (US); Colin Whitby-Strevens, Ben Lomond, CA (US); David G. Conroy, El Granada, CA (US); Robert L. Ridenour, Menlo Park, CA (US); Sreeraman Anantharaman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 15/087,590

(22) Filed: Mar. 31, 2016

(65) Prior Publication Data

US 2017/0061923 A1  Mar. 2, 2017

Related U.S. Application Data

(60) Provisional application No. 62/212,287, filed on Aug. 31, 2015.

(51) Int. Cl.
*G06F 3/14* (2006.01)
*G09G 5/12* (2006.01)

(52) U.S. Cl.
CPC .......... *G06F 3/1415* (2013.01); *G06F 3/1462* (2013.01); *G09G 5/12* (2013.01); *G09G 2340/0435* (2013.01); *G09G 2350/00* (2013.01); *G09G 2360/122* (2013.01); *G09G 2360/18* (2013.01)

(58) Field of Classification Search
CPC ....... G06F 3/1415; G06F 3/1462; G09G 5/12; G09G 2360/18; G09G 2360/122; G09G 2340/0435; G09G 2350/00
See application file for complete search history.

(56) References Cited

U.S. PATENT DOCUMENTS

| 6,263,396 | B1 * | 7/2001 | Cottle | ...................... | G09G 5/14 348/E11.021 |
| 6,369,855 | B1 * | 4/2002 | Chauvel | .................... | G09G 5/14 348/423.1 |
| 6,453,355 | B1 * | 9/2002 | Jones | ...................... | H04L 29/06 370/259 |
| 6,507,587 | B1 * | 1/2003 | Bahl | ................... | H04B 7/2656 370/348 |

(Continued)

OTHER PUBLICATIONS

Weiss; "Hybrid Computing: Advantages of Shared and Distributed Memory Combined", COMSOL, Mar. 6, 2014 (Year: 2014).*

*Primary Examiner* — Sathyanaraya V Perungavoor
*Assistant Examiner* — Philip P. Dang
(74) *Attorney, Agent, or Firm* — Fletcher Yoder PC (57) ABSTRACT

A display system includes a host device that provides source data to a display. The source data includes one or more data-centric blocks free from a fixed-frame size imposition, fixed-frame rate imposition, or both from the display. Further, the source data includes presentation data. The display system includes a display that receives the source data, decodes the source data to discern a presentation time, a presentation positioning, or both for the presentation data. Further, the display presents the presentation data according to the presentation time, the presentation positioning, or both.

30 Claims, 8 Drawing Sheets

(56) References Cited

U.S. PATENT DOCUMENTS

| | | | | |
|---|---|---|---|---|
| 6,541,971 B1* | 4/2003 | Dannels | ............ | G01R 33/4833 |
| | | | | 324/307 |
| 6,674,738 B1* | 1/2004 | Yildiz | ................... | H04L 1/0045 |
| | | | | 370/338 |
| 7,023,924 B1* | 4/2006 | Keller | ............. | H04N 21/23424 |
| | | | | 375/240.26 |
| 7,228,422 B2* | 6/2007 | Morioka | ............ | H04L 63/0227 |
| | | | | 380/210 |
| 7,681,244 B2* | 3/2010 | Morioka | ............ | H04L 63/0428 |
| | | | | 380/218 |
| 7,813,441 B2* | 10/2010 | Jalali | ....................... | H04L 5/023 |
| | | | | 375/267 |
| 7,899,864 B2* | 3/2011 | Margulis | ............... | G06F 3/1431 |
| | | | | 709/204 |
| 9,118,352 B2* | 8/2015 | Limberg | ........... | H03M 13/1515 |
| 2002/0174082 A1* | 11/2002 | Miloushev | ................ | G06F 8/36 |
| | | | | 706/47 |
| 2012/0307904 A1* | 12/2012 | Yi | ........................ | H04N 19/176 |
| | | | | 375/240.16 |
| 2015/0189486 A1* | 7/2015 | Lee | ......................... | H04W 4/06 |
| | | | | 370/259 |
| 2016/0226624 A1* | 8/2016 | Shoor | ................... | H04L 1/0041 |

* cited by examiner

DATA CENTRIC DISPLAY COMMUNICATIONS

CROSS REFERENCE TO RELATED APPLICATIONS

This application is a Non-Provisional Patent Application of U.S. Provisional Patent Application No. 62/212,287, entitled "Data Centric Display Communications", filed Aug. 31, 2015, which are herein incorporated by reference.

BACKGROUND

The present disclosure relates generally to techniques for facilitating communication between a video source and display panel and, more particularly to, techniques for data centric rather than frame centric video information to facilitate efficient communication between the video source and the display panel.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the marketplace today, there are a wide variety of electronic devices available for a wide variety of purposes. Such devices include cellular telephones, tablet computers, laptop computers, personal computers, televisions, headphones, Bluetooth® enabled watches, printers, and cameras, just to name a few. As display technology becomes more and more sophisticated, more and more data is communicated between a video source and the display panel that presents video information. For example, ever increasing screen resolutions are resulting in significant increases in data that is presented for display on these higher resolution displays. Oftentimes, the bandwidth constraints for transporting this data from the video source to the display panel may be a limiting factor for such increased data transports.

Additionally, there is a trend towards connector convergence, whereby the same connectors may be used for a variety of purposes, such as power, asynchronous data, and isochronous video data simultaneously. However, there may be a limited amount of communications bandwidth offered by techniques, as bandwidth considerations must be made for both video transport and the additional features (e.g., asynchronous data communications). Traditionally, when dedicated interfaces are used for video data (e.g., VGA for analog video data or DVI/DisplayPort/HDMI for digital video data), a full frame of video data is transmitted at the frame rate, requiring significant bandwidth.

Further, as higher-bandwidth data transmission becomes more desirable (e.g., for higher-resolution applications), it may be beneficial to incorporate forward error correction (FEC). FEC is a used to control errors in data transmission by the source of the transmission providing redundant data to the destination of the transmission. Using this redundant data, the destination may correct any erroneous data of the transmission. Unfortunately, traditional display interfaces use low level symbol encoding schemes (e.g., 8B10B encoding) that incur overhead (e.g., 20% overhead in 8B10B encoding).

SUMMARY

To address some of the concerns mentioned above, it is proposed to allow video sources to communicate with display panels using a "data centric" approach, rather than the more traditional "frame centric" approach. Traditional display interfaces have historically moved fixed sized frames at fixed frame rates from the source to the display. This has included horizontal and vertical blanking intervals that consume transport bandwidth. This creates inefficiency, especially considering the modernization of display technologies, which allow for untethering from this fixed frame transmission of display data.

In some embodiments, deviations from traditional fixed frame rate schemes may be accomplished by enabling display panels to self-refresh based upon data provided to the display panel. However, in non-static image display, power utilization efficiencies are not greatly affected by such schemes. In non-static image rendering, frame updates are sent frequently. Thus, there is relatively little, if any, updated power savings realized because the display panel maintains a local frame buffer for the self-refresh.

Thus, concepts disclosed herein relate to a transport mechanism between the source and the display that is more data centric, rather than frame centric. In some embodiments, data is transported in a block that is sized around 200 symbols (e.g., 198 bytes) to 1000 symbols (e.g., 966 bytes). Such sizing may allow for particular overhead efficiencies related to the transport to become much more efficient than traditional transport encoding (e.g., 8B10B encoding with control characters as special codes). For example, using the block scheme described herein, provides greater efficiencies than encoding schemes of traditional display interfaces. For instance, as explained above, the 8B10B encoding of traditional display interfaces may have an overhead of 20%. Additionally, adding control symbols for FEC may increase the overhead (e.g., by 2%), resulting in overhead that is greater than 20% (e.g., 22%). Thus, the overall efficiency may be reduced (e.g., to 78%). In contrast, by using the block encoding scheme and the FEC blocks described herein, a minimal amount of overhead may be used to transport the stream, which is FEC protected data. For example, block headers of the schemes described herein may use less overhead (e.g., sub 1% to 4% overhead), resulting in increased overall efficiencies (e.g., 99+% to 96% efficiency).

The techniques provided herein, relating to removal of historical dependencies on the isochronous video formals and scheduling, allow for reduced bandwidth requirements over traditional frame-centric video data communications, as an entire frame of data need not be provided, especially when portions of the video data have not changed. This may resulted in an increased effective bandwidth that may support higher resolutions of video data, greater color ranges (e.g., "deep color"), high dynamic range, etc., which may result in an improved user viewing experience.

Additionally, the techniques provided herein may result in error reduction in Forward Error Correction (FEC) and other techniques that are associated with "visually lossless" compression of the video data.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, data transmission bandwidth between video hosts and electronic displays is becoming an increasing concern as video display becomes more complex and/or display resolutions increase. To address some of the concerns mentioned above, it is proposed to allow video sources to communicate with display panels using a "data centric" approach, rather than the more traditional "frame centric" approach. Traditional display interfaces have historically moved fixed sized frames at fixed frame rates from the source to the display. This has included horizontal and vertical blanking intervals that consume transport bandwidth. This creates inefficiency, especially considering the modernization of display technologies, which allow for untethering from this fixed frame transmission of display data.

In some embodiments, deviations from traditional fixed frame rate schemes may be accomplished by enabling display panels to self-refresh based upon data provided to the display panel. However, such schemes may save little power in the display, because the display panel may maintain a local frame buffer for self-refresh. Moreover, when video data is provided (e.g., outside the periods of self refresh) the video data is still provided within the limitations of a fixed frame size at a fixed frame rate.

Thus, concepts disclosed herein relate to a transport mechanism between the source and the display that is more data centric, rather than frame centric. In other words, source data provided to a display may be provided as one or more data-centric blocks free of a fixed-frame size imposition, fixed-frame rate imposition, or both from the display. The source data may provide the presentation data to a display in a manner that does not comport with traditional frame-based requirements of displays. For example, source data may be provided for only a portion of a frame that has changed, without providing source data for portions of the frame that have not changed. Further, source data may be provided upon changes, rather than based upon fixed frame timings expected by the display.

In some embodiments, data is transported in a block that is sized around 200 bytes (e.g., 198 bytes). Such sizing may allow for particular overhead efficiencies related to the transport to become much more efficient than traditional transport encoding (e.g., 8B10B encoding with control characters as special codes). For example, encoding and packetization of the display data may be optimized towards an efficient implementation of Forward Error Correction schemes, which may be beneficial in embodiments where video compression schemes are used.

In certain embodiments, particular overhead elements desirable for the transport mechanism are described. For example, as may be appreciated, in certain embodiments, the overhead elements may include an indication of the particular data to be presented on the display. Additionally, timing indications for presentation of the particular data may be provided as an overhead element. Additionally or alternatively, Forward Error Correcting (FEC) parity (or Syndrome) bits may be included to reduce an error rate in presentation of the particular data at the display panel. Indeed, such FEC may be important in embodiments where compression is used, because a single bit error can result in undesirable visible artifacts during the presentation of the particular data at the display panel.

Turning now to the overhead elements, the discussion begins with the Forward Error Correction (FEC). Error correcting codes, such as Reed-Solomon codes, may be used to overcome erroneous data transmissions. Specifically, redundant information is added to data to ensure that the data may be reconstructed at a transmission destination, regardless of errors (e.g., transmission errors, access errors, storage errors, etc.). Using error-correcting codes, data is encoded as a sequence of symbols making up a codeword. Specifically, the Reed-Solomon encoding process assumes a code of RS(N, K) which generates code words of length N symbols each storing K symbols of data. The corresponding Reed-Solomon decoding process, when presented with a code word containing N (possibly corrupted) symbols, can reconstruct the K symbols of data (unless the N symbols are so badly corrupted that it is beyond the reconstruction capability of the code). Accordingly, (N–K)/2 errors may be corrected In some embodiments, the symbol size may be selected based upon the color component size. For example many systems use 8-bit color. Accordingly, symbols that are 8-bit in size may be efficient. Further, in deeper-color systems (e.g., high dynamic range (HDR) displays, 10-bit or 12-bit data per color per pixel may be used. Accordingly, the symbol size may be matched to 10-bit or 12-bit for these embodiments.

The implementation may be fixed on a symbol size. Accordingly, the implementation may be designed such that 10-bit and 12-bit pixel sizes may be packed into larger block sizes of 8-bit symbols with a defined packing process. In such embodiments, only one symbol size may be used to encode different source content color depth.

In some embodiments, 8-bit data and 12-bit data may be packed into 10-bit fields. Alternatively, 8-bit data and 10-bit data may be packed into 12-bit fields. Further, a Forward error correction (FEC) code may be added on top of traditional encoding schemes (e.g., 8B10B), resulting in encoding of 8B10B symbols versus pixel colors.

The Reed Solomon example below is useful for 8-bit pixel depth per color. 8-bit symbols can support blocks up to 255 symbols in size. If 10-bit pixel depth per color is used, then a symbol size of 10-bits may be used. This enables block sizes of approximately 1000 symbols (e.g., up to 1023).

RS(198,194) for 8-bit symbols and RS (966,960) for 10-bit symbols are large enough that Forward error correcting codes may be efficient with 4 bytes being able to correct two symbol errors code. Such a scheme may greatly reduce error rates in the presented data (e.g., 1 error in 1E9 bits may be reduced to one uncorrectable error event in 1E20 bits).

Thus, in embodiments using this RS(198,194) scheme, 198 byte blocks of data may be used for transmission from the source to the display panel. Of the 198 symbols of data transmitted, there are 194 symbols of input data. In embodiments using this RS(966,960) scheme, 966 symbol blocks of data may be used for transmission from the source to the display panel. Of the 966 symbols of data transmitted, there are 960 symbols of input data. In alternative embodiments, other RS(N, K) schemes may be used.

As previously discussed, the block schemes described herein may result in increased efficiencies over traditional encoding schemes. FEC may be used to protect against errors. The FEC may use encoding blocks that are sized to enable proper error correction. Further, data may be labeled as pixel payload data or control data (e.g., timing information), e.g., by utilizing headers to identify particular data in a block of data. Previous interfaces have embedded timing control within the data stream. To identify pixel payload from timing control, these traditional techniques used 2-bits of data to identify whether symbols were pixel payload or timing control This traditional technique results in high overhead. For example, 8B10B encoding has an overhead of 20%. When desired, FEC may be implemented at the symbol level, by adding additional control signals to identify the start and/or end of FEC data. Thus, control symbols used for framing, etc. may not be protected by FEC. Further, additional overhead may be needed for these extra control symbols, resulting in increased overhead (e.g., 2%). Thus, the overhead for such implementations may be greater than 20% (e.g., 22%), resulting in decreased overall efficiency (e.g., 78%).

In contrast, by using the block scheme with FEC described herein, a minimal amount of overhead may be used to identify the various data of the blocks. Accordingly, the block data schemes described herein may use less overhead (e.g., 4% overhead), resulting in increased overall efficiencies (e.g., 96% efficiency). 4K Mapping There are several sizes of data labeled as "4K." The most common may be 3840 pixels per line, while another may include 4096 pixels per line (4 k in binary 2^12). Each pixel may have 3 colors. If the color is mapped to a symbol, then there are 3×3840=11,520 symbols. If FEC blocks are created with an integral number of pixel payload symbols per line, certain efficiencies may be achieved. For example, a FEC block with a pixel payload of 960 symbols may occur 12 times in the 4K line of 3840 pixels. This same code of 4096 pixels per line would have 12.8 blocks (of size 960) per line. The unused space in the last line can simply wrap to the next line, so the efficiency loss due to adding extra headers per FEC block is quite small.

To construct an FEC block from 960 payload symbols, symbols may be added for packet headers (e.g., at least 2 symbols). Accordingly, the number of data symbols may equal Pixel data+header data=962. The syndrome bytes for error detection and correction would have a count of 4 for correcting double errors. Thus, the entire FEC block would have size=Pixel data+header data+syndrome=950+2+4=966 symbols. The 960 symbol count is 15 occurrences of a 64 symbol count, with block sizes of approximately 1000.

Audio may be encoded such that its header bytes, control bytes, and audio data are packed to fit in a 64 symbol sized block. This may enable the audio to be placed at the start or end of any FEC block, without significant loss of efficiency. Audio can be a media stream type or conveyed in a special control character scheme within the methods described herein. Even when the audio data is not optimally packed within the audio protocol itself, audio is infrequent enough that overall efficiency is not negatively impacted.

Data Identification

In some embodiments, the input data may include a header byte and/or a length byte. For example, using the RS(198, 194) embodiment described above, of the 194 bytes of input data, one header byte and/or one length byte may be present. The header byte may be used to indicate what the data type of the input data is. The length byte may provide an indication of how long the data field (e.g., the input data) is. Thus, when one header byte and one length byte is present in an RS(198, 194) embodiment, 192 bytes remain for input data. As may be appreciated, the 192 byte payload is a very convenient size as an integral number of 192 byte payloads may transport lines of multiple video resolutions (e.g., HD, 4K, 5K, 8K video).

In situations where the data field (e.g., the input data) is less than amount allotted for the data field (e.g., 192 bytes in RS(198, 194) embodiments), the length field may provide an indication of the number of bytes used. A byte following the last data field byte associated with the first header may be used for an additional header with an associated length. These additional headers may be useful for additional data, such as audio data or other auxiliary data. In some embodiments, alternate video streams or other supplementary data payloads may be facilitated via these additional headers and associated data fields. The overhead for identifying data and data lengths is relatively small. For example, in the RS(198, 194) embodiment described above, the overhead to identify the data and its length is 2 bytes of 194 bytes, or roughly 1% overhead.

The headers can be defined to include start of frame bit and state of line bits to convey these timings as required. For example, in some embodiments, special control headers with a location byte may be used. These special control headers may be implemented as an auxiliary header byte and may be used to indicate when given control symbol functions should be invoked (e.g., in time or a per byte timing basis). Accordingly, the current embodiments may be used to convey timing of presentation data, while reducing overhead. For example, using the current embodiments it may not be necessary for each byte to contain overhead bits to provide an indication of whether the byte is a data or control byte.

Figure 1:
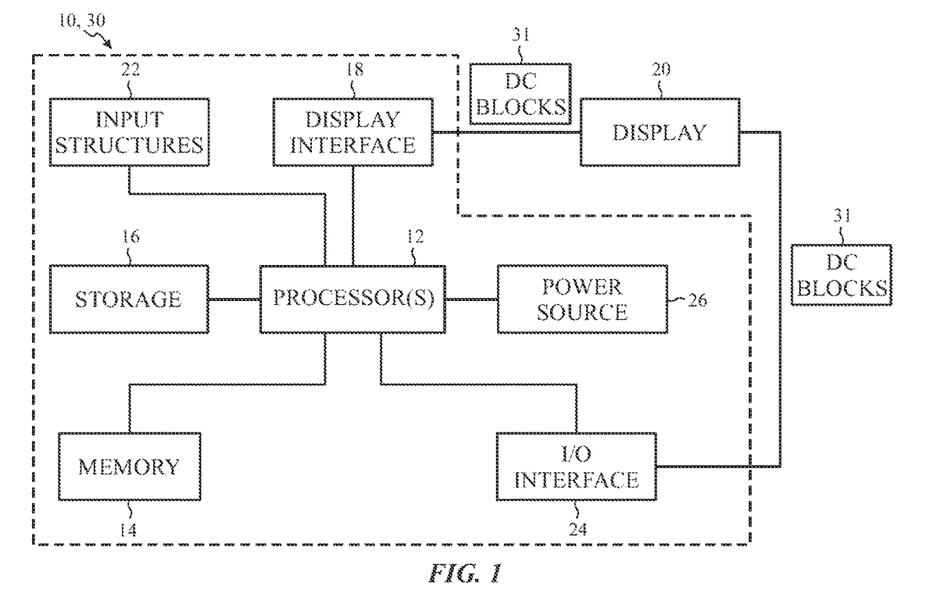
FIG. 1 is a schematic block diagram of an electronic device including display control circuitry, in accordance with an embodiment.

With these features in mind, a general description of suitable electronic devices that may act as data centric display communication sources and/or display panels is provided. Turning first to FIG. 1, an electronic device 10 according to an embodiment of the present disclosure may include, among other things, one or more processor(s) 12, memory 14, nonvolatile storage 16, a display interface 18, a display 20 (which may be a separate device in some embodiments), input structures 22, an input/output (I/O) interface 24 and a power source 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

The electronic device 10 may act as a host device 30 that sources video data to the display 20. For example, data-centric block data 31 may be generated (e.g., by the processor 12) and may be provided to the display 20 (e.g., via the display interface 18 (e.g., a High-Definition Multimedia Interface (HDMI) port and/or a Universal Serial Bus (USB) port, such as a USB Type C port). Additionally and/or alternatively, the data centric block 31 data may be provided via the I/O interface 24. In some embodiments, multiple-streams may primarily fill different data centric blocks 31.

Figure 2:
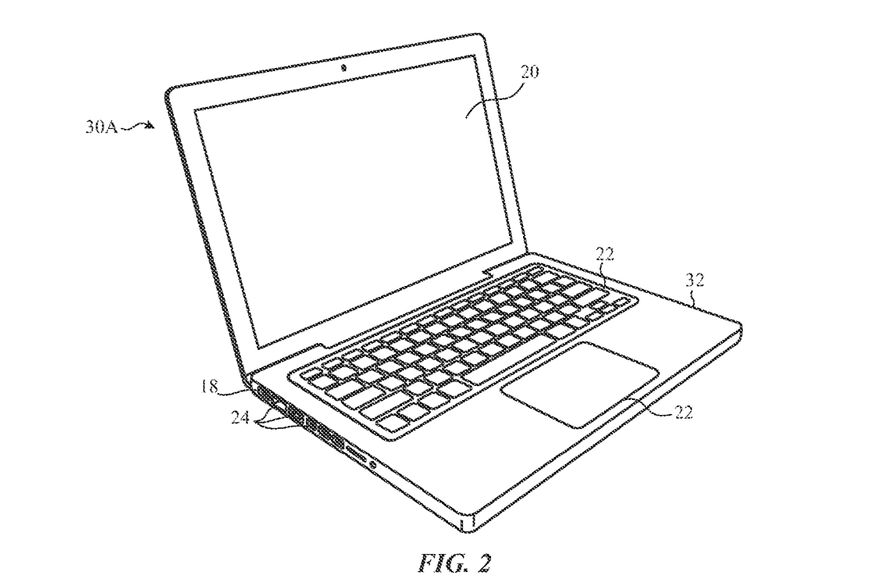
FIG. 2 is a perspective view of a notebook computer representing an embodiment of the electronic device of FIG. 1, in accordance with an embodiment.
Figure 3:
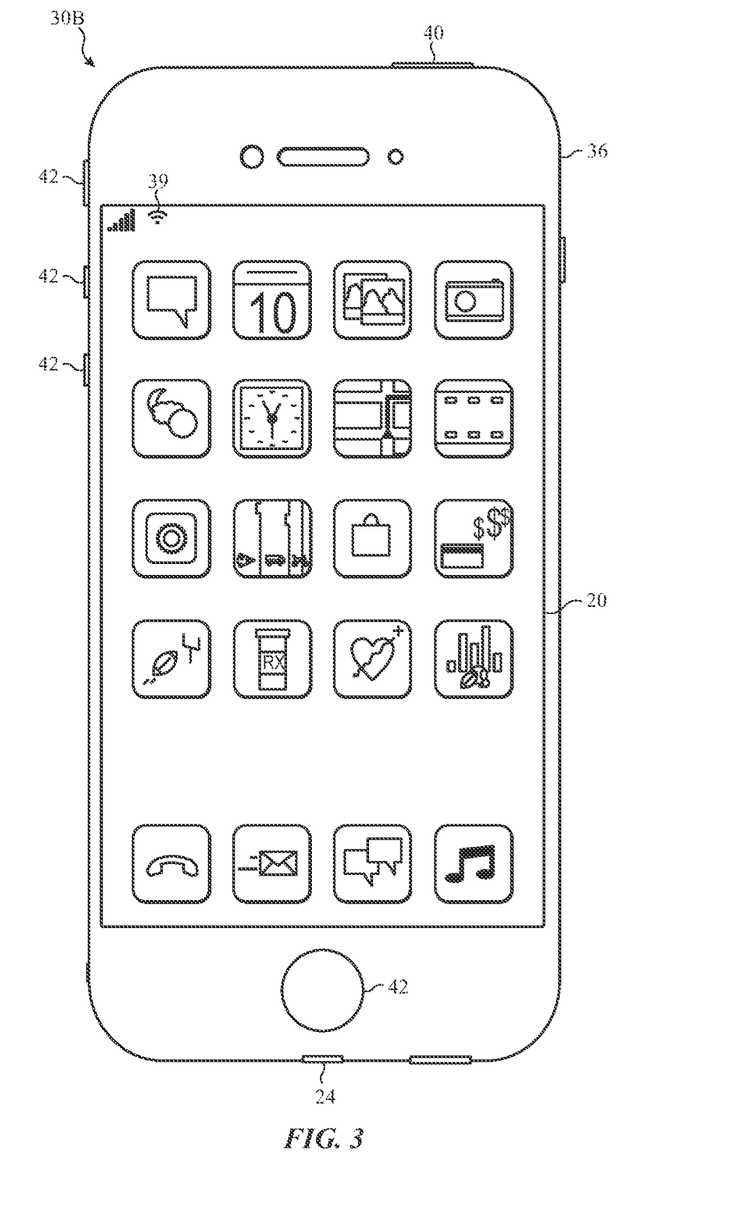
FIG. 3 is a front view of a hand-held device representing another embodiment of the electronic device of FIG. 1, in accordance with an embodiment.
Figure 4:
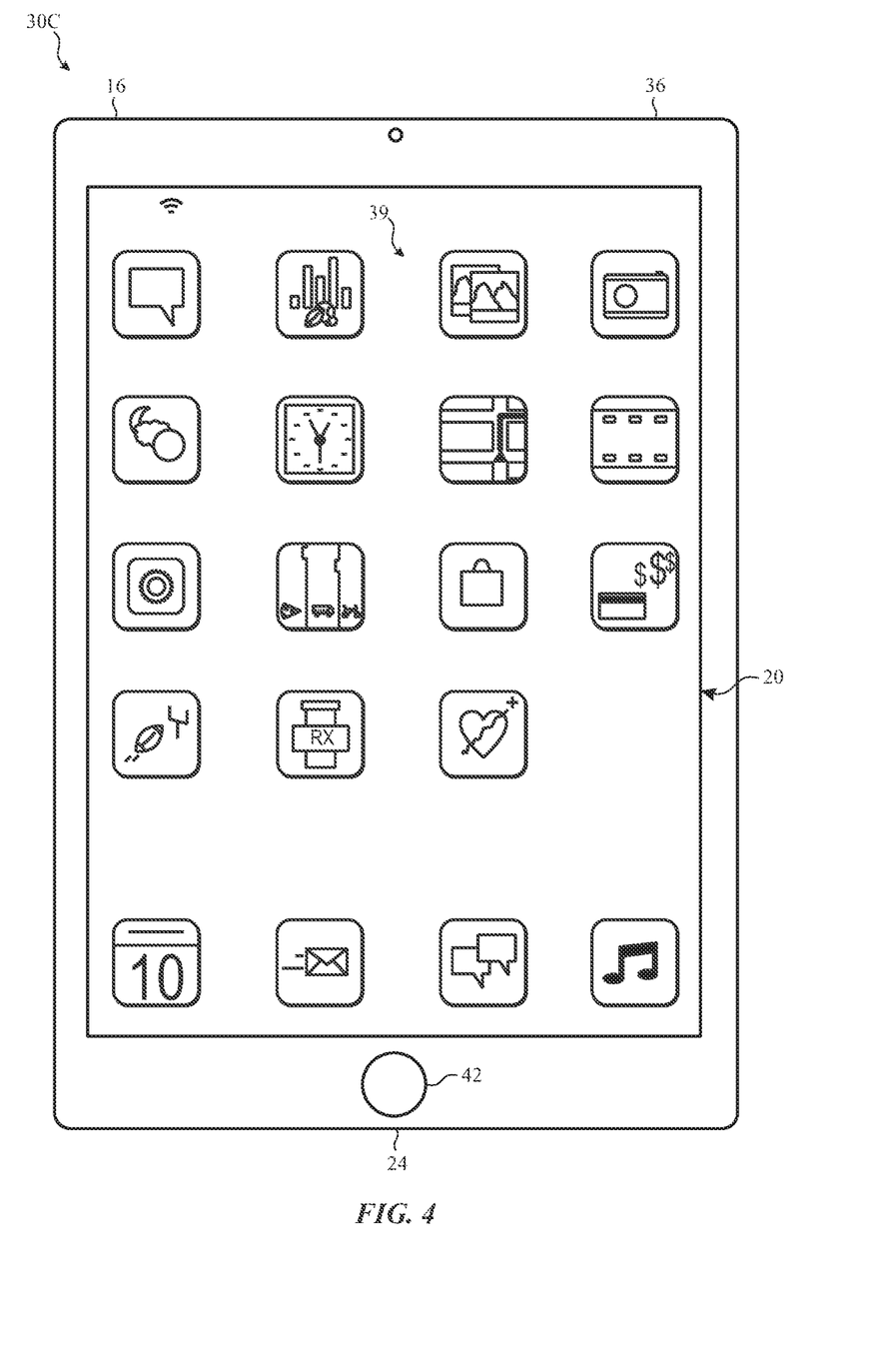
FIG. 4 is a front view of another hand-held device representing another embodiment of the electronic device of FIG. 1, in accordance with an embodiment.
Figure 5:
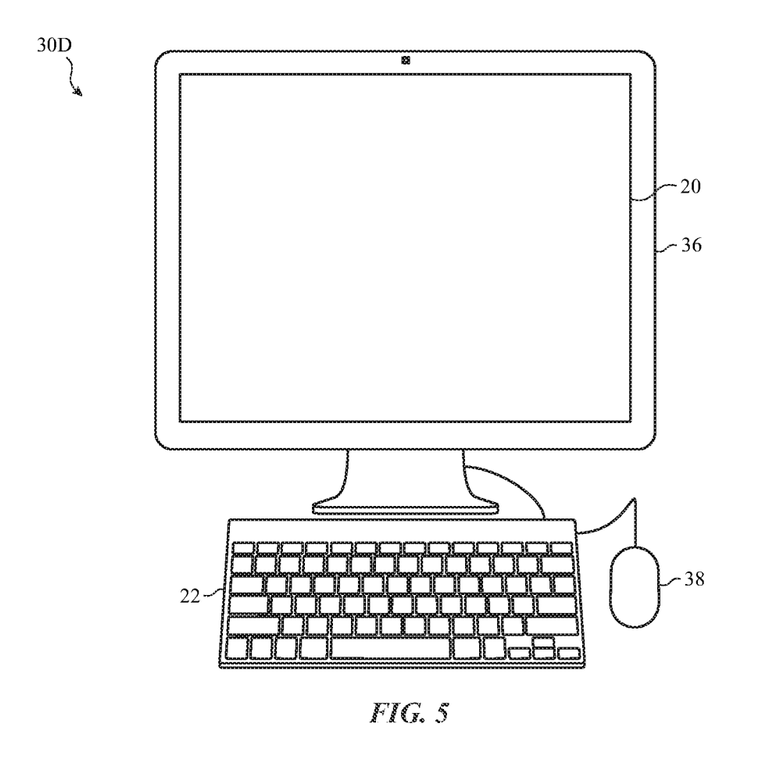
FIG. 5 is a front view of a desktop computer representing another embodiment of the electronic device of FIG. 1, in accordance with an embodiment.
Figure 6:
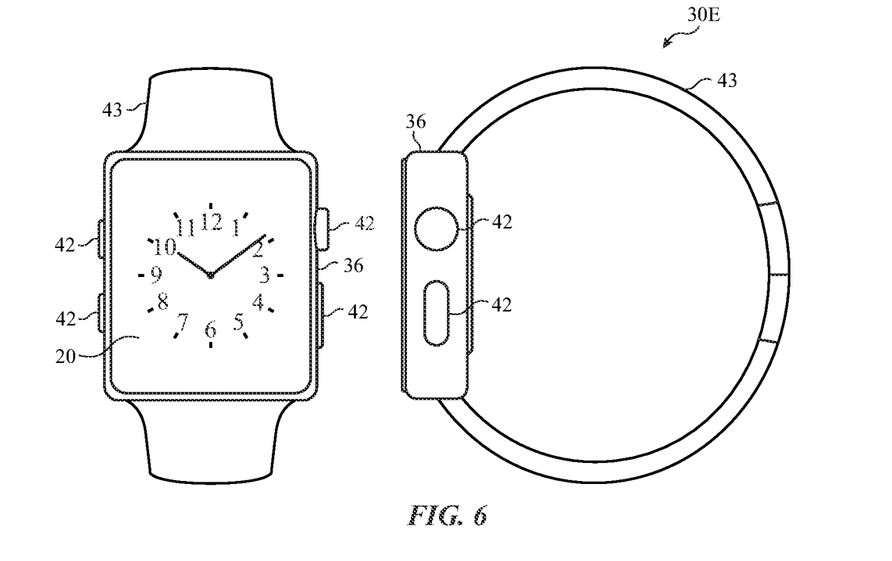
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., e.g., an operating system) encoded on such a computer program product may also include instructions that may be executed by the processor(s) 12 to enable the electronic device 10 to provide various functionalities.

In certain embodiments, the display 20 may be a liquid crystal display (e.g., LCD), which may allow users to view images generated on the electronic device 10. In some embodiments, the display 20 may include a touch screen, which may allow users to interact with a user interface of the electronic device 10. Furthermore, it should be appreciated that, in some embodiments, the display 20 may include other display technologies, such as light emitting diodes (e.g., LED, OLED, AMOLED, etc.) displays, or some combination of LCD panels and LED panels.

The input structures 22 of the electronic device 10 may enable a user to interact with the electronic device 10 (e.g., e.g., pressing a button to increase or decrease a volume level). The I/O interface 24 may enable electronic device 10 to interface with various other electronic devices. The I/O interface 24 may include various types of ports that may be connected to cabling. These ports may include standardized and/or proprietary ports, such as USB, RS232, Apple's Lightning® connector, as well as one or more ports for a conducted RF link. The I/O interface 24 may also include, for example, interfaces for a personal area network (e.g., PAN), such as a Bluetooth network, for a local area network (e.g., LAN) or wireless local area network (e.g., WLAN), such as an 802.11a/b/g/n Wi-Fi network, and/or for a wide area network (e.g., WAN), such as a 3rd generation (e.g., 3G) cellular network, 4th generation (e.g., 4G) cellular network, or long term evolution (e.g., LTE) cellular network. The I/O interface 24 may also include interfaces for, for example, broadband fixed wireless access networks (e.g., WiMAX), mobile broadband Wireless networks (e.g., mobile WiMAX), and so forth.

As further illustrated, the electronic device 10 may include a power source 26. The power source 26 may include any suitable source of power, such as a rechargeable lithium polymer (e.g., Li-poly) battery and/or an alternating current (e.g., AC) power converter. The power source 26 may be removable, such as replaceable battery cell.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include housing or enclosure 32, a display 20, input structures 22, and ports of the I/O interface 24. In one embodiment, the input structures 22 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 20.

As may be appreciated, in certain embodiments, the display interface 18 may be internal to the electronic device 10 (e.g., the computer 30A). For example, the computer 30A may include an internal display interface 18 that provides data to the display 20. Additionally and/or alternatively, an external display interface 18 (as depicted in FIG. 2) may present data to an external display (not depicted). The current techniques may be implemented regardless of whether the display interface 18 is internally facing or externally facing.

FIG. 3 depicts a front view of a handheld device 30B, which represents one embodiment of the electronic device 10. The handheld device 30b may represent, for example, a portable phone, a media player, a personal data organizer, a handheld game platform, or any combination of such devices. By way of example, the handheld device 30b may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 20, which may display indicator icons 39. The indicator icons 39 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a connector and protocol, such as the Lightning connector provided by Apple Inc., a universal service bus (e.g., USB), one or more conducted RF connectors, or other connectors and protocols. In some embodiments, the I/O interfaces 24 may also act as a display interface 18 for providing data to an external display (not depicted).

User input structures 40 and 42, in combination with the display 20, may allow a user to control the handheld device 30B. For example, the input structure 40 may activate or deactivate the handheld device 30B, one of the input structures 42 may navigate user interface to a home screen, a user-configurable application screen, and/or activate a voice-recognition feature of the handheld device 30B, while other of the input structures 42 may provide volume control, or may toggle between vibrate and ring modes. Additional input structures 42 may also include a microphone may obtain a user's voice for various voice-related features, and a speaker to allow for audio playback and/or certain phone capabilities. The input structures 42 may also include a headphone input to provide a connection to external speakers and/or headphones.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif. As mentioned above, in some embodiments, the I/O interfaces 24 may also act as a display interface 18 for providing data to an external display (not depicted). Further, the display 20 may be provided data via an internal display interface 18.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 36 may be provided to protect and enclose internal components of the computer 30D such as the display 20. In certain embodiments, a user of the computer 30D may interact with the computer 30D using various peripheral input devices, such as the keyboard 22 or mouse 38, which may connect to the computer 30D via a wired and/or wireless I/O interface 24. As depicted, the rear of the computer 30D may include an externally facing display interface 18. Further, an internally facing display interface 18 may provide data for presentation by the display 20.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., e.g., pedometer, accelerometer, heart rate monitor), or other device by another manufacturer. In some embodiments, the display 20 of the wearable electronic device 30E may include a touch screen (e.g., e.g., LCD, OLED display, active-matrix organic light emitting diode (e.g., AMOLED) display, and so forth), which may allow users to interact with a user interface of the wearable electronic device 30E. In the current embodiment, an internal display interface 18 may provide data to display 20. Further, the wearable electronic device 30E may be battery operated. As may be appreciated, reduced power consumption of battery operated devices may be highly desirable. Accordingly, the techniques described herein may benefit battery operated devices, especially smaller battery operated devices, as they may have smaller batteries.

Figure 7:
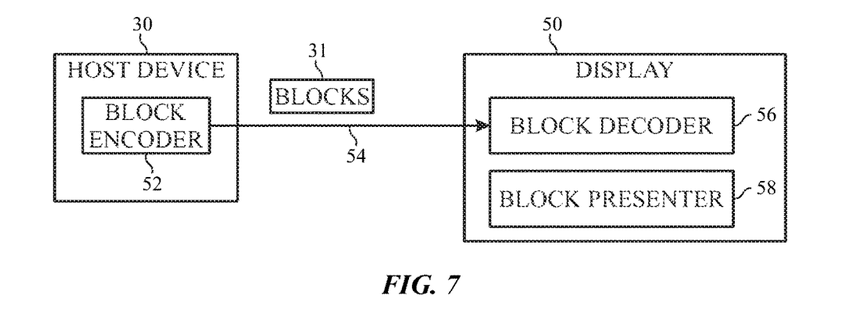
FIG. 7 is a diagram illustrating a first electronic device providing data centric display data to a display device, in accordance with an embodiment.

As mentioned previously, it is often desirable for host devices to provide video data to a display 20 for presentation on the display 20. In view of the various disadvantages associated with traditional frame centric data being provided to the display 20, many situations may arise where more data centric display data would be a desirable alternative to facilitate such communication. Indeed in a communication scenario that would benefit from relatively high bandwidth and relatively low power consumption, data centric video data represents a good option. One such example is illustrated in FIG. 7, where data centric video data (e.g., data centric block data 31) is generated by a host device 30 (e.g., block encoding instructions 52 implemented in software or hardware) and transported via transmission lines 54 to the display 20. Block decoding instructions 56 (e.g., implemented in hardware and/or as software-based computer-readable instructions) may decode the blocks 31 and provided the decoded data to a presentation module 58 that presents the data centric decoded data. In certain embodiments, to reduce a dependency of traditional frame centric data, the blocks of data may include positioning information and/or timing information, which the block presentation module 58 may use to render presentation data in a non-stream-provided format (e.g., provided as data blocks rather than data streams).

An entire block 31 may be presented to the receiving system (e.g., the display 20), rather than streaming data to the receiving system (e.g., the display 20). As will be discussed in more detail below, control field elements/indicators may be used to provide control information useful for presentation of display data on the display 20. For example, control location indicator bytes may be used to satisfy timing needs of the receiving system (e.g., the display 20). For example, a control location indicator may be used to drive associated media stream timing of frame sync and/or line sync to the receiving system (e.g., the display 20). Using the control location indicators, the receiving system (e.g., the display 20) may regenerate timings for the block 31 data.

As may be appreciated, the blocks 31 reduce an amount of data to be sent to the display 20, by leaving the traditional stream-based data provision of video data. In other words, in contrast to traditional systems that provided streams of video data that included horizontal and/or vertical blanking to ensure proper placement and timing of a stream of video data, the data centric block data 31 may provide a particular indication of placement of the data and/or timing of the presentation data, such that blanking data may no longer be necessary for proper presentation of video data. In fact, in certain situations where there is static video presentation in certain portions of the presented content, data pertaining to unchanged video data may not need to be transferred via the transmission lines 54, freeing up bandwidth of the transmission lines 54 for dynamically changing video data portions. In some embodiments, using this data centric data, different refresh rates and/or other characteristics of the video data may be utilized for varied regions (e.g., lines) of the display 20.

Figure 8:
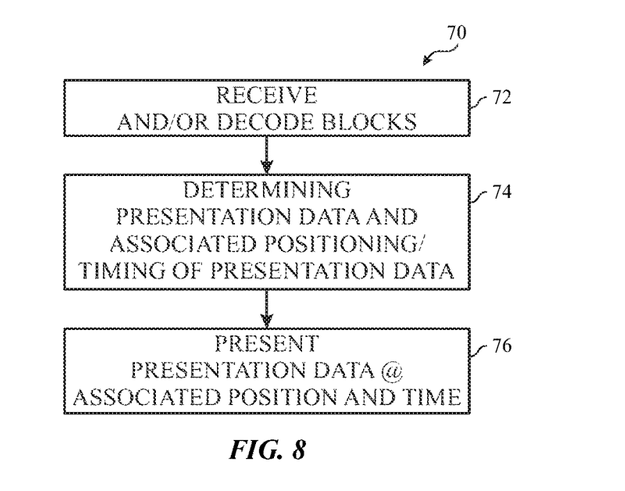
FIG. 8 is a machine-implemented method of presenting data centric device data on a display, in accordance with an embodiment.

As illustrated in FIG. 8, to provide the benefits of the data centric display data, the block presentation module 58 of the display 20 may implement a processor-implemented method 70. As illustrated, the data centric blocks 31 may be received and/or decoded for consumption by the display 20 (block 72). After receiving and/or decoding the data centric blocks 31, the blocks 31 are analyzed to determine the presentation data and associated characteristics and/or instructions (e.g., a position for displaying the presentation data and/or a timing to present the presentation data) (block 74). Lastly, the presentation data is presented via the display 20 according to the characteristics and/or instructions determined in block 74 (block 76).

Figure 9:
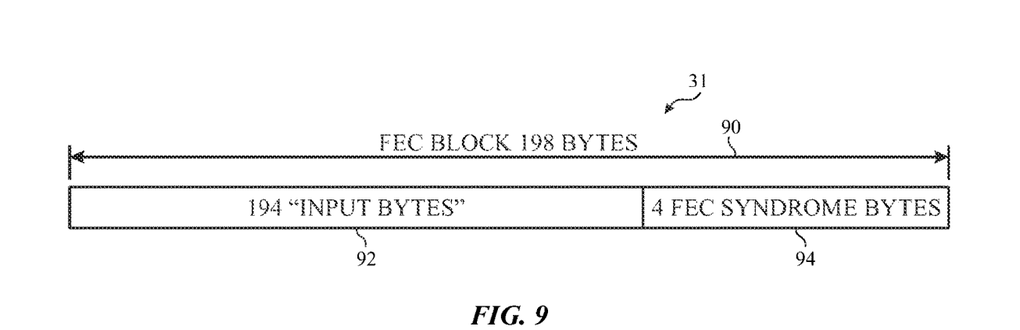
FIG. 9 is a schematic diagram of a structure of data centric blocks of display information, in accordance with an embodiment.

Turning now to a discussion of embodiments of the data centric block 31 structure, FIG. 9 provides an illustration of a forward-error-correcting (FEC) data centric block 31. As mentioned above, in certain embodiments it may be useful to use a Reed-Solomon RS(198,194) scheme in the data centric block 31 definition and/or transmission. In alternative embodiments, other sizing schemes may be utilized. For example, as mentioned above, the RS(966, 962) scheme may be used for a 10-bit symbol case. However, for the purposes of discussion, assuming RS(198,194) is used for the encoded blocks 31, the encoded blocks 31 may be based on a total block size 90 of 198 bytes. Further, up to 194 "input bytes" 92 and 4 FEC check (e.g., parity) bytes 94 may be included in the RS(198, 194) block 31.

As will be discussed in more detail below with regard to FIGS. 10 and 11, the input bytes 92 may provide media data field elements (e.g., video data payload) and/or control field elements (e.g., timing and/or placement data for the media data field elements). The FEC check (e.g., parity) bytes 94 provide error correction information that may be used to reconstruct any erroneous data in the input bytes 92.

Figures 10A, 10B:
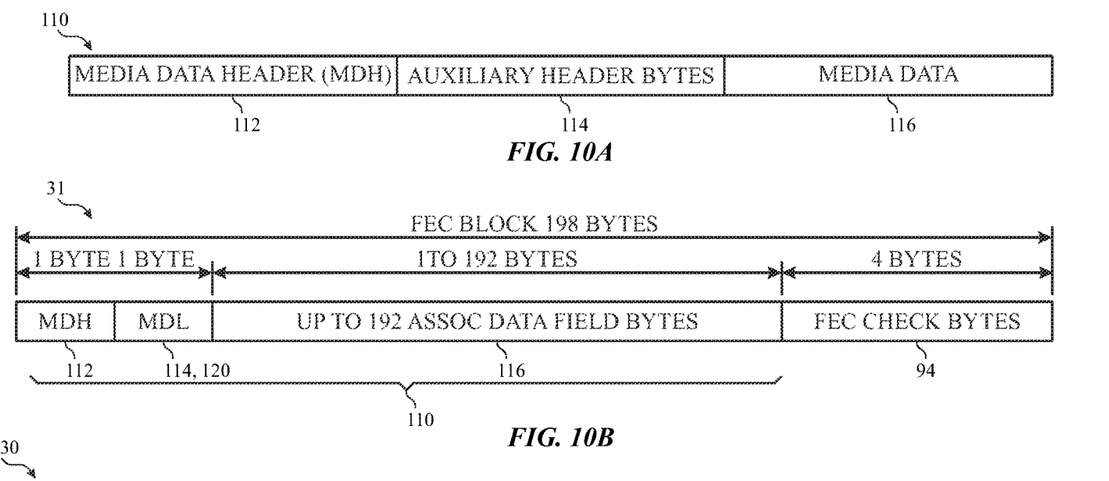
FIG. 10A is a schematic diagram of a media data element structure for use in data centric blocks of display information, in accordance with an embodiment.
FIG. 10B is a data centric block having a media data element that includes a media data length, in accordance with an embodiment.

Turning now to a more detailed discussion of the input bytes 92 composition, FIG. 10A illustrates a media data field element 110 that may be included as one or more input bytes 92. As discussed above, the media data field element 110 may be used for the video data payload transport. The media data field element 110 may include a media data header byte 112, one or more auxiliary header bytes 114, and/or media data (e.g., payload) 116 associated with media data header byte 112 and/or auxiliary header bytes 114.

The auxiliary header bytes 114 may be useful for expanding the functionalities of the media data elements 110. For example, in one embodiment, the auxiliary header bytes 114 may be used to provide a media data field length specification. Accordingly, an explicit indication of a length of the media data field 116 may be made by using an auxiliary header byte 114 as a media data field length indicator. As may be appreciated, the maximum length for a 198 block 31 would be 198 minus 4 bytes for FEC syndrome bytes 94 minus 1 byte for the media data header 112 minus 1 byte for the auxiliary header byte 114 (e.g., used as a media data field length header)=192 bytes.

For example, FIG. 10B includes an auxiliary header byte 114 that is a media data length 120. The media data length describes a length for the media data in the media data field 116. As in FIG. 10A, the media data element 110 includes a header 112. As may be appreciated the block 31 also includes FEC check (e.g., parity) bytes 94.

As may be seen, the auxiliary header bytes 114 may be useful for future functionality of the display system/transport. While usage as a media data field length header has been provided as an example, these bytes may be used for many other uses.

The input bytes 92 may also include control field elements 130. FIG. 11A illustrates a structure for the control field elements 130, in accordance with an embodiment. The control field elements 130 may provide an indication of timing and/or positioning of the media data field elements 110. The control field elements 130 may include a control indicator header 132, one or more auxiliary control header bytes 134, and/or optional associated control data 136.

The auxiliary control header bytes 134 may be useful for expanding the functionalities of the control field elements 130. For example, in one embodiment, the auxiliary control header bytes 134 may be used to provide a control indicator location byte. Accordingly, by using the control header indication byte, the receiver may drive respective media stream timing of frame sync and/or line sync pings to the receiving subsystem.

Figure 11A:
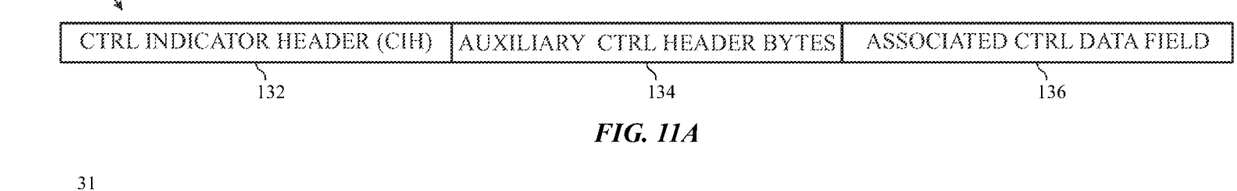
FIG. 11A is diagram of a control field element structure for use in data centric blocks of display information, in accordance with an embodiment.
Figure 11B:
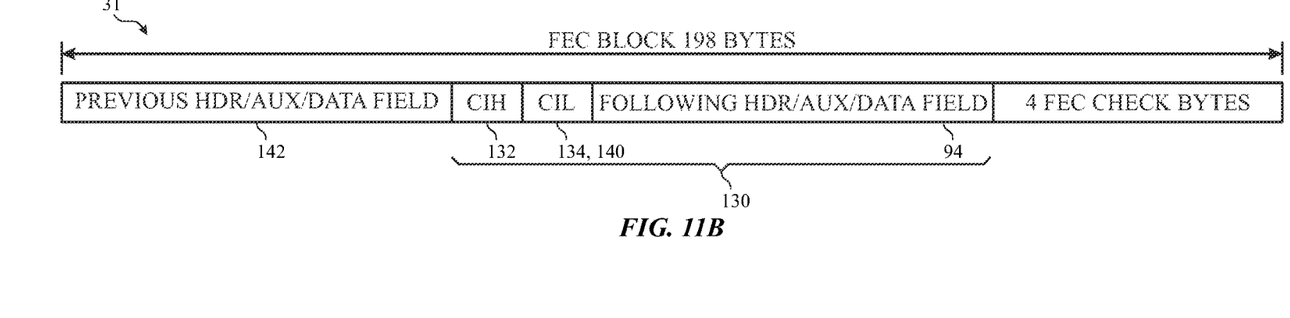
FIG. 11B is a diagram of a block having a control field element with a control indicator location byte, in accordance with an embodiment.

For example, FIG. 11B includes an auxiliary header byte 134 that is a control indicator location byte 140. As in FIG. 11A, the media data element 110 includes a header 112. As may be appreciated the block 31 also includes FEC check (e.g., parity) bytes 94. As indicated, the bytes representing a control header indicator 132 and the control indicator location 140 and/or other auxiliary header bytes 134 may occur anywhere in available input bytes 92. For example, they may occur after a number of previous header, auxiliary header, and/or data field byte elements 142 and may be followed by subsequent header, auxiliary header, and/or data field byte elements 144. The block 31 ends with 4 byte FEC check (e.g., parity) bytes 94.

As may be seen, the auxiliary control header bytes 134 may be useful for future functionality of the display system/transport. While usage as a media data field length header has been provided as an example, these bytes may be used for many other uses.

Figure 12:
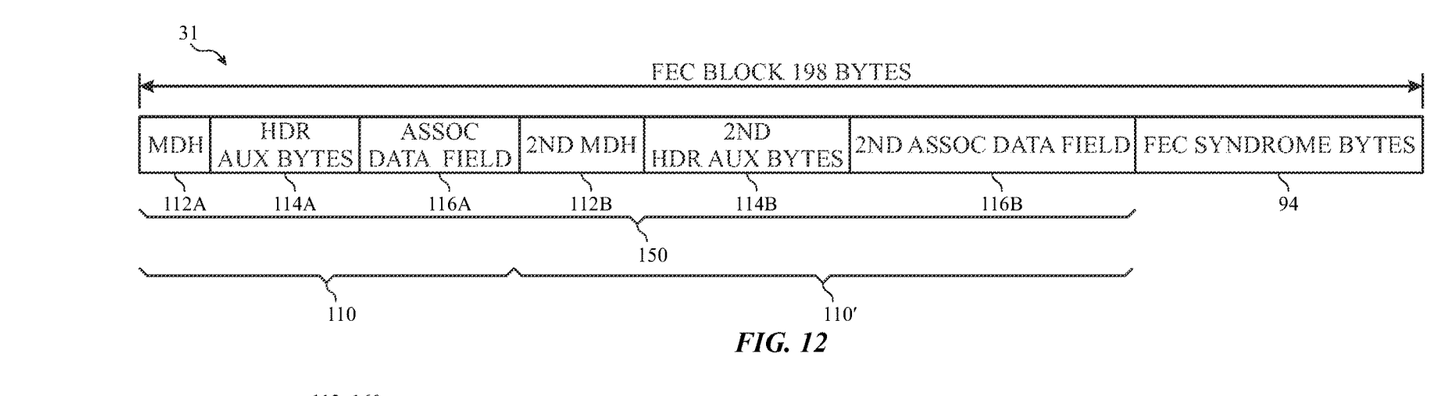
FIG. 12 is a diagram of a data centric block of display data that includes multiple media data elements of FIG. 10 and/or control field elements of FIG. 11A, in accordance with an embodiment.

Knowing now that the input bytes 92 of the blocks 31 may include one or more media data elements 110 and/or control field elements 130, FIG. 12 provides an illustration of an input bytes 92 structure 150 in a data centric block 31. The input bytes 92 may start with a header byte 112A (e.g., a media data header 112, as illustrated in FIG. 10). Additionally, auxiliary header bytes 114A (e.g., auxiliary header bytes 114 of FIG. 10) may be included immediately following the header byte 112A. Media data associated with the media data header 112A and/or auxiliary header bytes 114A may follow the auxiliary header bytes 114A.

Additional media data elements 110 and/or control field elements 130 may be included in the data centric block 31, as long as there is enough bytes available in the block 31 (e.g., the new element 110 and/or 130) does not cause the number of used bytes to exceed the 194 input bytes 92. Accordingly, as illustrated in FIG. 12, an additional media data element 110' is appended immediately after the previous element 110. Thus, the first byte following the end of a previous data field (e.g., a media data field 116 of FIG. 10A and/or an associated control data field 136 of FIG. 11A) may begin a new header byte (e.g. a media data header 112 of FIG. 10A and/or a control indicator header 132 of FIG. 11A) and the structure of its associated element (e.g., the media data element 110 of FIG. 10A and/or the control field element 130 of FIG. 11A).

In other words, the byte following a completed media data field 116 and/or a control field 136 may contain a new header byte (e.g., a media data header 112 of FIG. 10A and/or a control indicator header 132 of FIG. 11A). The input bytes (e.g., input bytes 92 of FIG. 9) may continue to be populated (e.g., by the encoder 52) until 194 bytes are consumed. As will be discussed in more detail below, the actual length of the data fields may be implicit and/or explicitly declared (e.g., in the header information).

Figure 13:
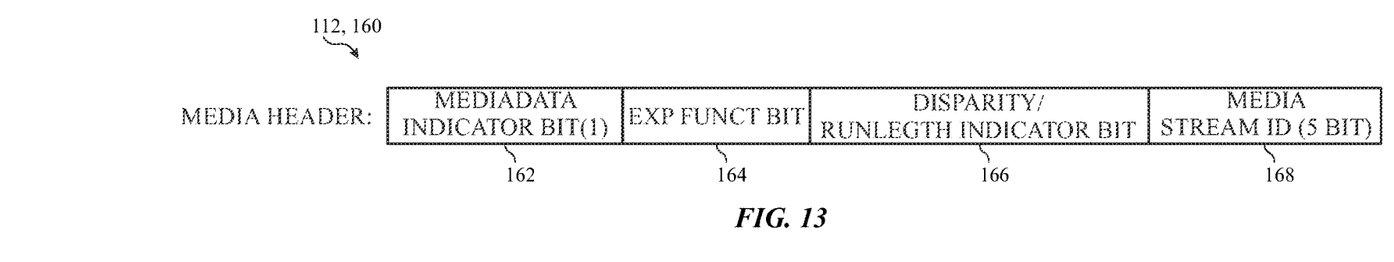
FIG. 13 is a diagram of a media data element header structure, in accordance with an embodiment.

Turning now to a discussion of the contents of the headers, FIG. 13 provides an illustration of a media data header 112 structure for a header 160, in accordance with an embodiment. The first bit 162 of the header byte provides an indication of whether or not the header 160 is a media data header 112. For example, in the current embodiment, the header 160 indicates that it is a media data header 112 by providing a "1" in the first bit 162 of the header 160. The media data header 112 includes an expanded function bit 164, a disparity/Run length indicator bit 166, and media stream indicator bits 168.

In some embodiments, the expanded function bit may be set to "0" to indicate a full frame mode. A setting of "1" may be used to indicate the expanded function mode, which may include indication of a sub-region, sub-line, etc. to update with the media data. Additional auxiliary bytes may be defined for the expanded function mode. For example, a line number indication may occupy 2 bytes, a start pixel indication may occupy 2 bytes, a log length may occupy 1 byte, and/or an associated presentation time stamp may occupy up to 8 bytes. As may be appreciated, using this expansion, media updates may be coordinate based, time based, etc.

Figure 14:
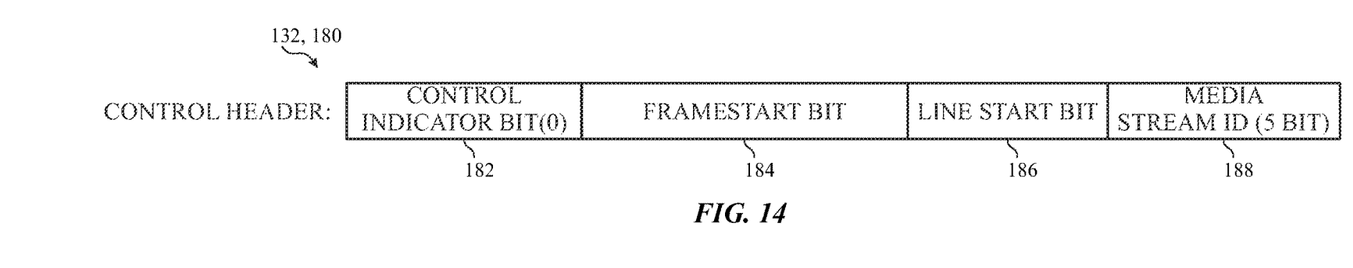
FIG. 14 is a diagram of a control field element header structure, in accordance with an embodiment.

As mentioned above for control field elements 130, a control indicator header 132 is used. FIG. 14 provides an illustration of a control field header 122 structure for a header 180, in accordance with an embodiment. The first bit of the header 180 of the header byte provides an indication of whether or not the header 180 is a control indicator header 132. For example, in the current embodiment, the header 180 indicates that it is a control indicator header 132 by providing a "0" in the first bit 182 of the header 180. The control indicator header 132 may also include control information useful for controlling the presentation of media on the display. For example the control indicator header 132 may include a Frame Start bit 184 that provides an indication of a frame start, a line start bit 186 that provides an indication of a line start, and one or more media stream indicator bits 188.

The frame start bit 184 may indicate that the control field element 130 includes a frame start and the line start bit 186 may indicate that the control field element 130 includes a line start. If both the frame start bit 184 and the line start bit 186 are "0", then neither a frame start nor a line start occurs. This may be the most common intra-line header that is used by the data centric transport mechanism.

Media stream indicator bits 188 may be set to "00000" to indicate an expanded header definition. For example, the expanded header definition may include a fill type control indicator header (e.g., the auxiliary header having a control indicator location, as discussed above). Further, the expanded header definition may include a time stamp control character with an associated time stamp data field. Additionally, a configuration control field may be provided that is useful for start up functions for the display 20.

In some embodiments, expanded control headers may be defined using programmable tables. Thus, short headers may be used for new function developed over time, by setting the transmitter and/or receiver tables at the start of use of the data centric transmission mechanism using the expanded control headers. As may be appreciated, this may result in lower level transport mechanisms to adapt to new modes as they are developed, without needing to restrict the low level transport mechanisms.

Figure 15:
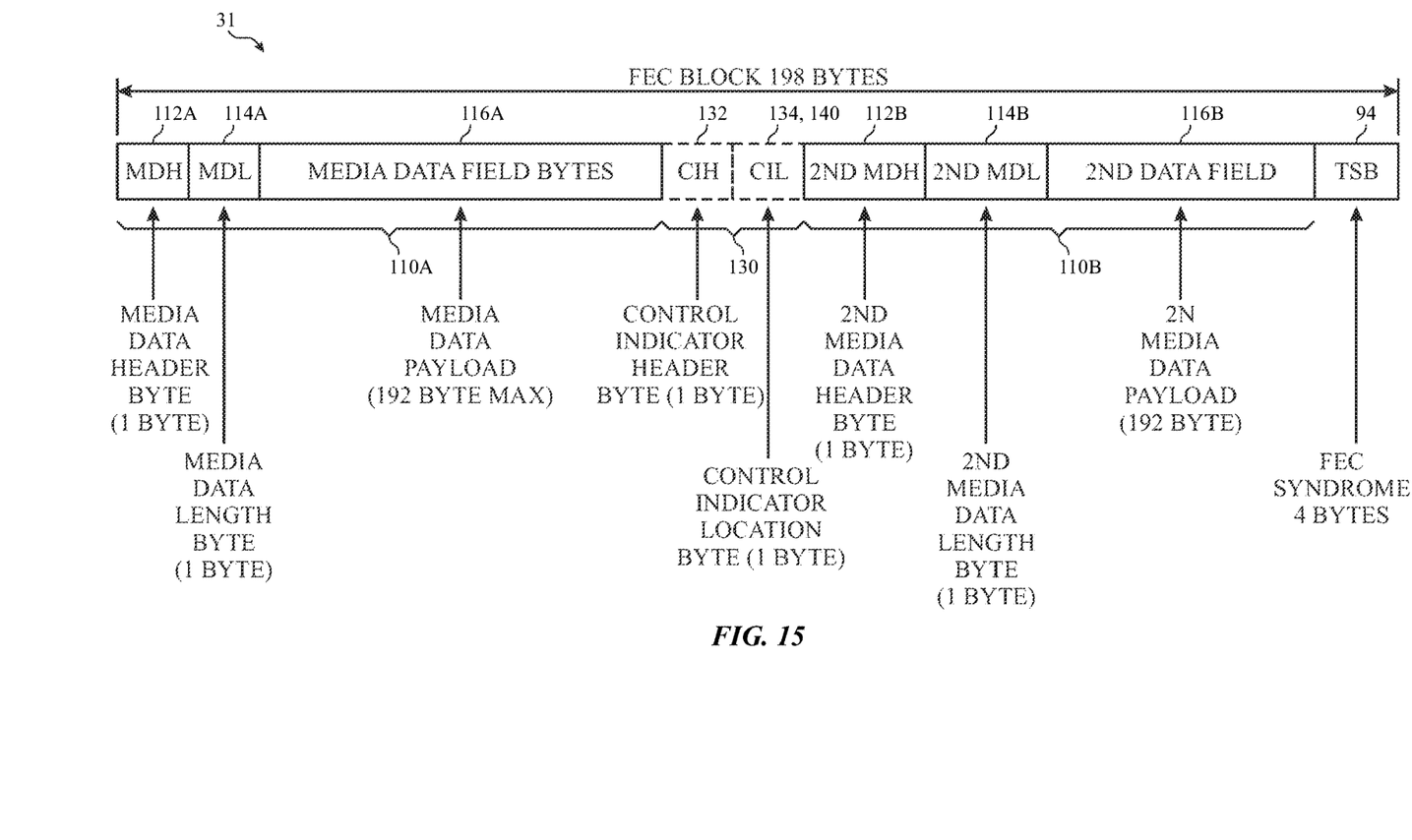
FIG. 15 is a diagram illustrating a block having an assortment of media data elements and control field elements, in accordance with an embodiment.

FIG. 15 illustrates a data centric block of display data that includes an assortment of the elements described herein. For example, the block 31 includes two media data elements 110A and 110B, each respectively having a media data header byte 112A and 112B, a media data length 114A and 114B, and media data field bytes 116A and 116B. Additionally, the block 31 includes a control field element 130 that includes bytes representing a control header indicator 132 and an auxiliary header 134 that provides a control indicator location byte 140. The block 31 concludes with 4 bytes of check (e.g., parity) bytes 94.

Other Applications

As mentioned above, the block data scheme may be useful for reducing overhead and facilitating forward error correction more effectively. However, additional applications may be efficiently implemented by using the block data scheme described herein. For example, as mentioned above, timestamps may be included in the data. These timestamps may provide an indication as to when a particular piece of data should be presented on a display. Accordingly, data may be sent prior to invocation on the display, allowing for pre-processing and/or data transmission of future content at a time when bandwidth constraints may be lower. For example, if the display is currently displaying static content or is idle, less data may be transmitted to the display (because in some embodiments only changes to the data need to be provided to the display). Accordingly, during that time of decreased bandwidth, power consumption may be reduced, as less processing power is needed to render the static image. In some embodiments, the low-bandwidth data transmission may be used to transfer subsequent content changes that may be implemented later in time. This may enable to the display to pre-process the data prior to presenting the data at the display, and may enable the lower bandwidth transmission period to be used to transmit data for use at a future time. This may help to reduce bandwidth bottlenecking, by enabling a portion of data that would be transferred during a high-bandwidth transfer to occur prior to the high-bandwidth transfer.

Further, certain embodiments may implement data scrambling to counteract resonance excitement of the display interface. Cross talk in connectors may be limited by resonant peaks. Resonances are often caused by ground loops and/or power loops via receptacles and/or corresponding plugs that are paired by a consumer of the electronic device. To avoid resonance excitement, the block data may be scrambled in a manner that avoids bit sequences that would concentrate energy at any possible resonant frequencies. These possible resonant frequencies may be limited by a range of practical lengths. For example, if a connector is 22 mm long with a delay of 6 psec per mm, there is a 120 psec delay, with a 240 psecs per wavelength (e.g., about 4 Ghz resonant frequency). A typical shortest connector might be 10 Ghz resonant, due to having a minimum length.

A resonance at 5 Ghz would be excited with a 1010101010 . . . bit pattern, where the energy climbs with the length of the sequence. To limit this, the data could be scrambled. For example, the system could choose between several scrambler combinations of data, depending on a determination of the scrambler combination with the best properties. Thus, the system could avoid strings of 0101 or 1010 by choosing a scrambler combination that minimizes such patterns.

Further, to be more exhaustive in avoiding sequences that have resonant peaks, the system may take the Fast Fourier Transform (FFT) of the bits to be sent to the display. A FFT of a 1 bit resolution sequence may be much easier to compute than higher bit count "samples." Further, such computations may only need to be calculated across a particular frequency range of interest.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display system, comprising:
  a host device, configured to provide source data to a display, wherein the source data comprises one or more data-centric blocks, comprising:
    presentation data to be displayed by the display that comprises only a portion of a frame that has changed, wherein the presentation data is free of a fixed-frame size imposition from the display or free of a fixed-frame rate imposition from the display, or both; and
    positioning information for the presentation data that indicates a position of the portion of the frame that has changed; or
    timing information for the presentation data that indicates a time that the portion of the frame that changed; or
    both the positioning information and the timing information,
    wherein proper presentation of the presentation data is presented in a manner independent from blanking intervals; and
  the display, configured to:
    receive the source data,
    decode the source data to discern a presentation time from the timing information, a presentation positioning from the positioning information, or both for the presentation data; and
    present the presentation data according to the presentation time, the presentation positioning, or both.

2. The display system of claim 1, wherein the host device is configured to provide the source data as blocks of data rather than a stream of data to the display.

3. The display system of claim 1, wherein the one or more data-centric blocks comprise at least one control field indicator that indicates that the presentation data comprises control information.

4. The display system of claim 3, wherein the at least one control field indicator comprises a control location indicator, configured to provide one or more media stream timings of frame sync, line sync pings, or both to the display.

5. The display system of claim 4, wherein the display is configured to regenerate timings for the one or more data-centric blocks based at least upon the control location indicator.

6. The display system of claim 1, wherein the host device is configured to not transfer static presentation data that has already been provided to the display.

7. The display system of claim 1, wherein display is configured to present the presentation data based upon the presentation time, the presentation positioning, or both, despite the presentation data not being provided with horizontal blanking, vertical blanking, or both.

8. The display system of claim 1, wherein the presentation data comprises video data.

9. The display system of claim 8, wherein a refresh rate of a particular region of the video data is altered using the one or more data-centric blocks.

10. A host device, comprising:
  circuitry, configured to:
    generate source data for transmission to a display, wherein the source data comprises one or more data-centric blocks, comprising:
    presentation data to be displayed by the display that comprises only a portion of a frame that has changed, wherein the presentation data is free of a fixed-frame size imposition from the display or free of a fixed-frame rate imposition from the display, or both; and
    positioning information for the presentation data that indicates a position of the portion of the frame that has changed; or
    timing information for the presentation data that indicates a time that the portion of the frame that changed; or
    both the positioning information and the timing information,
    wherein proper presentation of the presentation data is presented in a manner independent from blanking intervals using the positioning information, the timing information, or both.

11. The host device of claim 10, wherein the one or more data-centric blocks adhere to a structure comprising: input bytes for transmission of a payload and check bytes for transmission of parity bytes.

12. The host device of claim 11, wherein the input bytes comprise 194 bytes and the check bytes comprise 4 bytes.

13. The host device of claim 11, wherein the input bytes comprise one or more media data field elements used to transport video data payload.

14. The host device of claim 13, wherein the one or more media data field elements comprise a media data header byte that indicates to the display that the one or more data-centric blocks comprises a media data field.

15. The host device of claim 14, wherein the media data header byte comprises a first bit that provides an indication of whether or not the media data header byte is the media data header, a second bit comprising an expanded function bit, a third bit comprising a disparity/run length indicator bit, and one or more media stream indicator bits.

16. The host device of claim 13, wherein the one or more media data field elements comprise an auxiliary header byte that indicates to the display that the one or more data-centric blocks comprises an auxiliary element expanding upon functionalities of the media data field elements.

17. The host device of claim 16, wherein the auxiliary header byte is configured to provide a media data field length specification of the one or more media data field elements.

18. The host device of claim 13, wherein the one or more media data field elements comprise a payload field comprising payload data associated with:
an auxiliary header byte that indicates to the display that the one or more data-centric blocks comprises an auxiliary element expanding upon functionalities of the media data field elements,
a media data header byte that indicates to the display that the one or more data-centric blocks comprises a media data field element, or
both.

19. The host device of claim 11, wherein the input bytes comprise one or more control field elements used to provide an indication of timing, positioning, or both of one or more media data field elements comprising the presentation data.

20. The host device of claim 19, wherein the one or more control field elements comprise a control indicator header byte that indicates to the display that the one or more data-centric blocks comprises a control field.

21. The host device if claim 20, wherein control indicator header byte comprises a first bit that provides an indication of whether or not the control indicator header byte is the control indicator header, a second bit comprising frame start bit, a third bit comprising a line start bit, and one or more media stream indicator bits.

22. The host device of claim 19, wherein the one or more control field elements comprise an auxiliary header byte that indicates to the display that the one or more data-centric blocks comprises an auxiliary element expanding upon functionalities of the control field elements.

23. The host device of claim 22, wherein the auxiliary header byte is configured to provide a media data field length specification of the one or more media data field elements.

24. The host device of claim 23, wherein the auxiliary header byte is configured to provide a control indicator location byte that the display may use to drive respective media stream timing of frame sync pings, line sync pings, or both.

25. A display, comprising:
circuitry, configured to:
receive source data from a host, the source data comprising one or more data-centric blocks, comprising:
presentation data to be displayed by the display that comprises only a portion of a frame that has changed, wherein the presentation data is free of a fixed-frame size imposition from the display or free of a fixed-frame rate imposition from the display, or both; and
positioning information for the presentation data that indicates a position of the portion of the frame that has changed; or
timing information for the presentation data that indicates a time that the portion of the frame that changed; or
both the positioning information and the timing information,
wherein proper presentation of the presentation data is presented in a manner independent from blanking intervals;
decode the source data to discern a presentation time based upon the timing information, a presentation positioning based upon the positioning information, or both for the presentation data; and
present the presentation data according to the presentation time, the presentation positioning, or both.

26. The display of claim 25, wherein the circuitry is configured to:
receive the one or more data-centric blocks prior to the presentation time; and
halt presentation of the presentation data until the presentation time.

27. The display of claim 25, wherein the circuitry is configured to:
receive the one or more data-centric blocks comprising presentation for on a portion of a presentation area; and
update on the portion of the presentation area at the presentation time.

28. The display of claim 25, wherein the circuitry is configured to:
receive two data-centric blocks comprising payloads for separate content streams; and
present the payloads for the separate content streams at a respective presentation time, presentation positioning, or both.

29. The display of claim 25, wherein the one or more data-centric blocks adhere to a Reed-Solomon encoding comprising 198 codewords comprising a length of 198 symbols, each codeword storing 194 symbols of data (RS (198, 194)).

30. The display of claim 25, wherein the one or more data-centric blocks comprise data scrambled to counteract resonance excitement of a display interface coupling the host and the display.

* * * * *